INVENTOR.
PHILIP J. HERB
BY
Thomas M Marshall
ATTORNEY

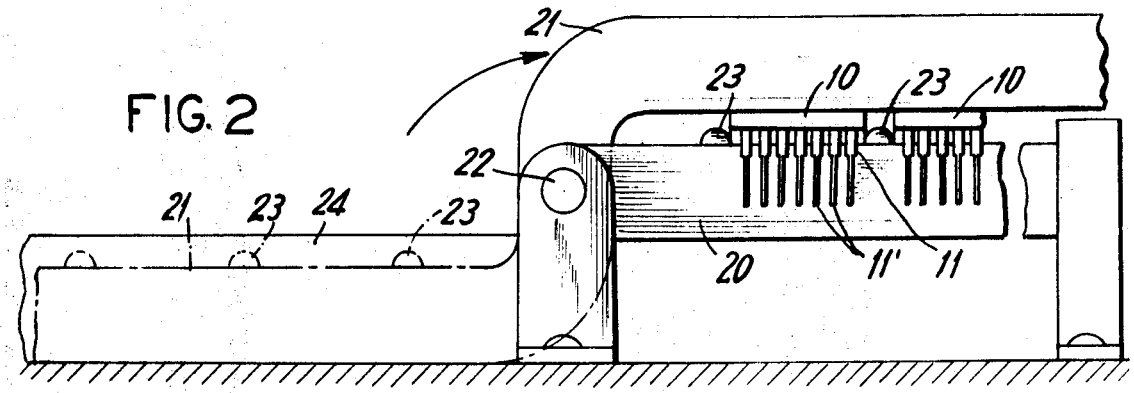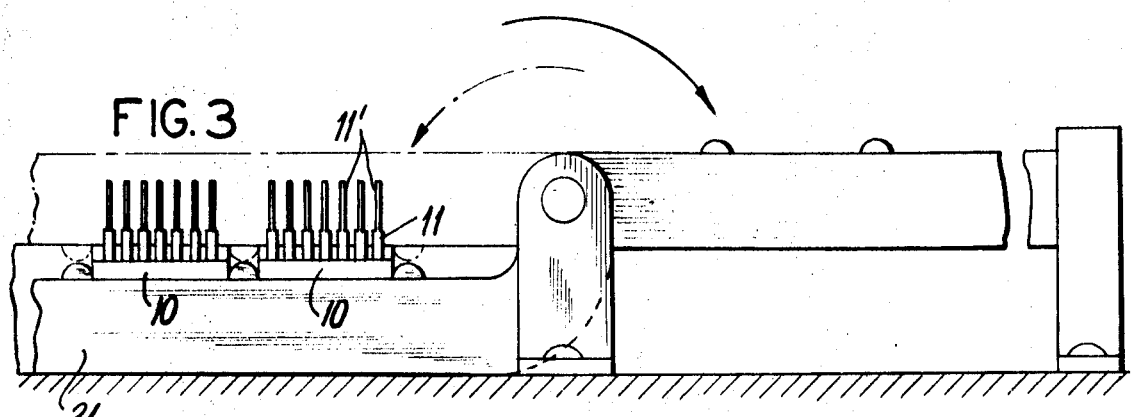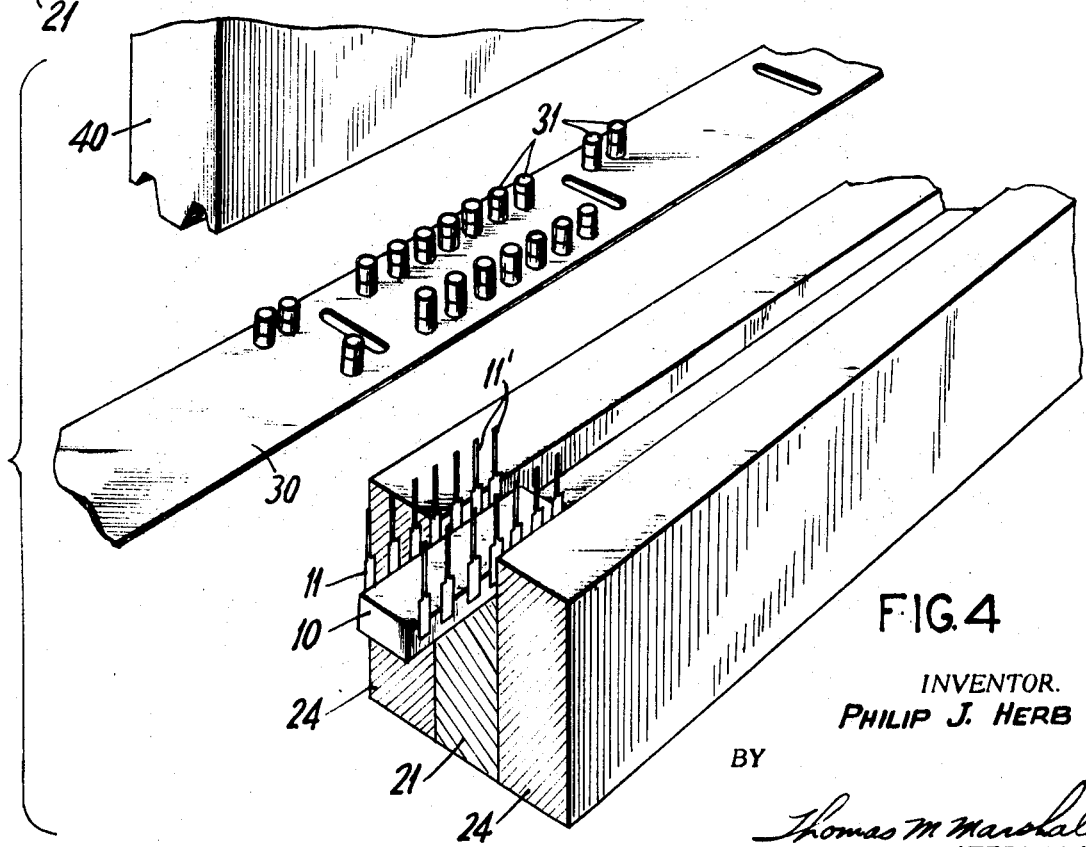

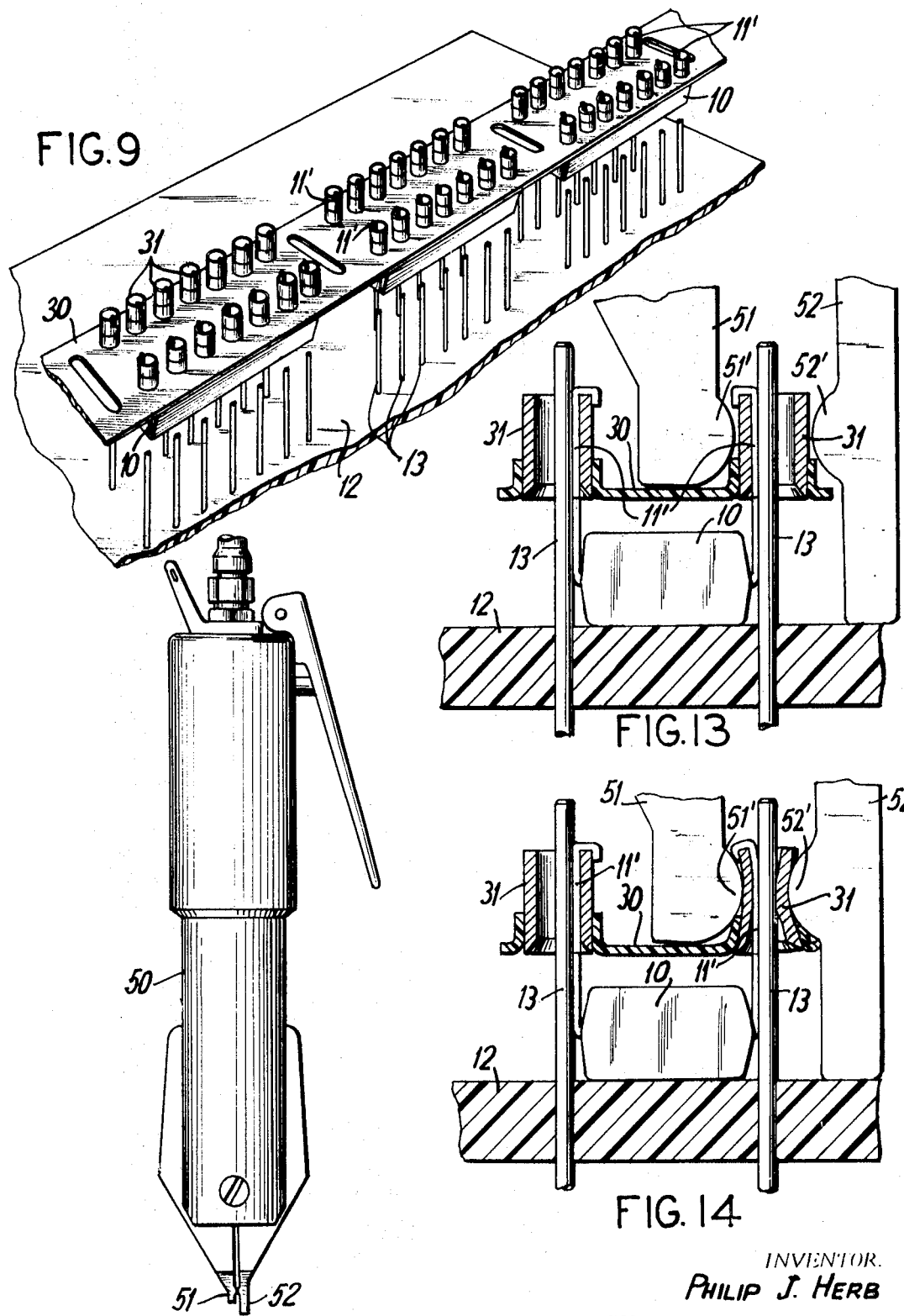

Oct. 12, 1971 P. J. HERB 3,611,562
METHOD OF ATTACHING MICROCIRCUIT PACKS TO A PANEL BOARD
Filed Dec. 5, 1969 6 Sheets-Sheet 5
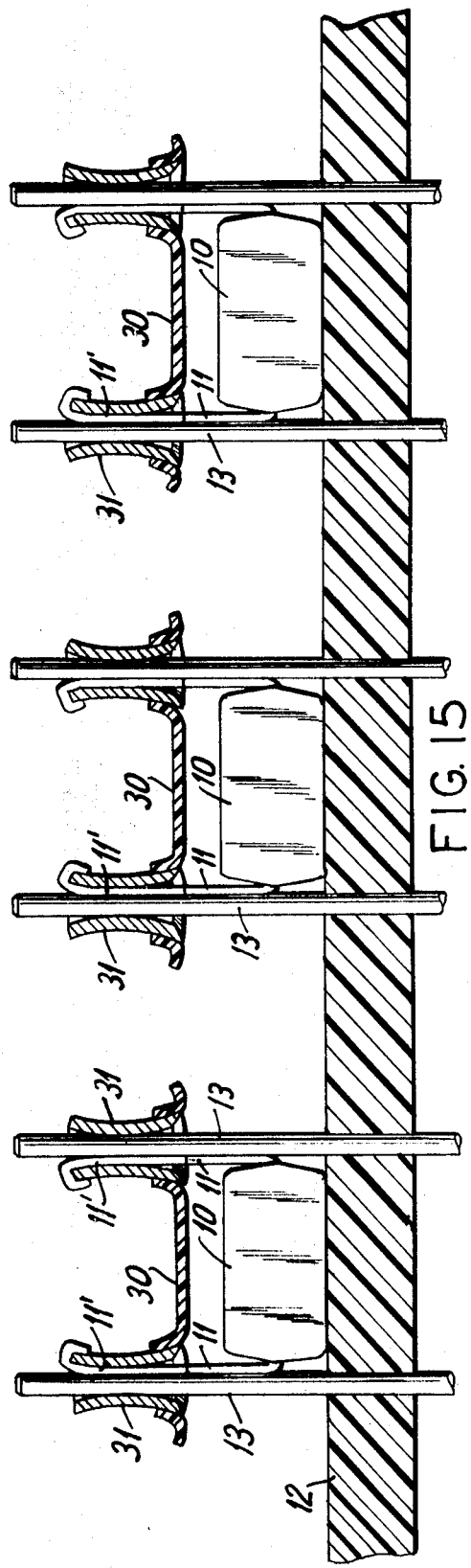
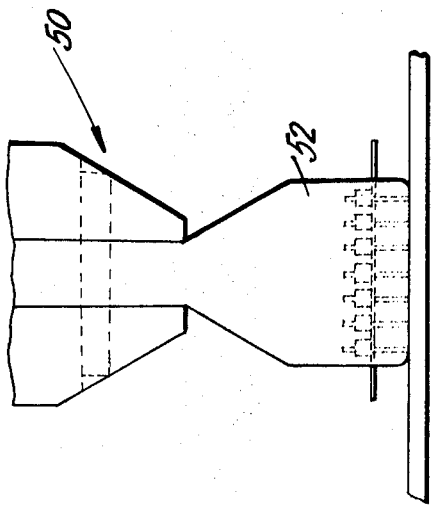
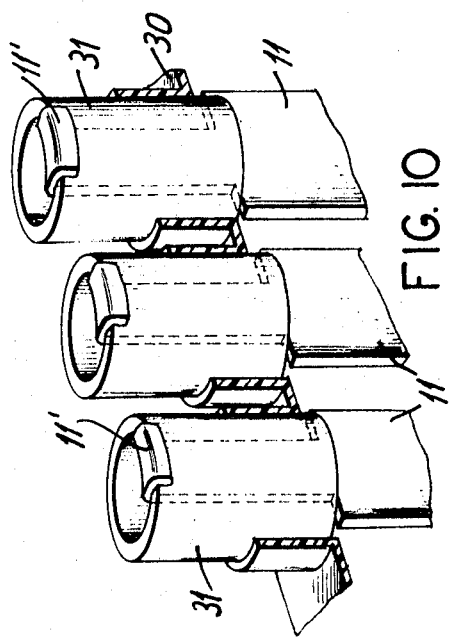
INVENTOR.
PHILIP J. HERB
BY
Thomas M Marshall
ATTORNEY Oct. 12, 1971  P. J. HERB  3,611,562
METHOD OF ATTACHING MICROCIRCUIT PACKS TO A PANEL BOARD
Filed Dec. 5, 1969  6 Sheets-Sheet 6

INVENTOR.
PHILIP J. HERB
BY
Thomas M Marshall
ATTORNEY

United States Patent Office 3,611,562
Patented Oct. 12, 1971

3,611,562
METHOD OF ATTACHING MICROCIRCUIT PACKS TO A PANEL BOARD
Philip J. Herb, Somerville, N.J., assignor to Thomas & Betts Corporation, Elizabeth, N.J.
Filed Dec. 5, 1969, Ser. No. 882,576
Int. Cl. H05k 3/30; H01r 43/00
U.S. Cl. 29—626                                6 Claims

ABSTRACT OF THE DISCLOSURE

A method of mass connecting a plurality of microcircuit packs to the printed circuit panel comprises loosely fastening a row of integrated circuit packs to a plurality of crimpable electrical connectors carried by a carrier strip. The carrier strip is then placed over the upstanding pins in the circuit panel such that the upstanding pins also extend through the respective electrical connectors. Using a mass crimping technique, the electrical connectors are crimped thereby forming a mechanical and electrical connection between the integrated circuit packs and the upstanding pins.

---

As the computer circuit technology has become more complex, it has been increasingly difficult to economically wire computer circuits with existing connectors. Each computer circuit, such as a micro or integrated circuit pack, includes a plurality of leads, which may be arranged in two rows. Generally, a plurality of integrated circuit packs are arranged in rows on a circuit panel and electrically connected to pins which extend through the panel. Connected to the opposite sides of the pins are leads extending from other circuits in the computer system.

One prior art technique requires the use of a socket receptacle for each integrated circuit pack. Each socket must be located and fixedly mounted to a printed circuit board. In turn, each integrated circuit pack is held in place in the socket receptacle by spring pressure. Because of the close tolerances required for achieving the required spring pressures, the socket receptacles are expensive. Furthermore, the reliability of the connection is limited by the frictional spring contact between the integrated circuit pack and the socket, and the assembly of a plurality of integrated circuit packs into their respective sockets is a manual operation, whereby only one integrated circuit pack at a time is connected to the panel. One additional disadvantage of the "socket" technique is that the resulting assembly has a relatively high profile because of the stacking of the socket and the integrated circuit pack.

Another prior art technique employs individual socket terminals or pins which are designed such that one end is a socket for receiving one of the leads of an integrated circuit pack, while the opposite end is suitable for connection, e.g. by wire wrapping, to other leads in the computer circuit. The individual socket terminals are located and partially forced through a circuit board. After the required number of pins are assembled, the leads of the integrated circuit pack may be respectively inserted into the socket ends of the socket terminals. As in the case of the "socket" technique, the use of socket terminals is expensive, and the reliability is limited by the quality of the frictional contact between the lead and the spring contact in the socket terminal. Furthermore, because standard dual-in-line integrated circuit packs have fourteen or sixteen leads, the use of individual socket terminals may cause alignment problems, thereby resulting in bent leads and damaging of the integrated circuit pack.

Accordingly, it is an object of this invention to provide a method of simultaneously connecting a plurality of microcircuit packs.

It is a further object of this invention to provide a method of simultaneously connecting a plurality of microcircuit packs which is economical and produces highly reliable connections.

It is another object of this invention to provide a method of simultaneously connecting a plurality of microcircuit packs which results in a low profile assembly.

It is still another object of this invention to provide a method of simultaneous connection of a plurality of microcircuit packs which may be performed by unskilled personnel thereby reducing the cost of assembly.

Briefly, the subject invention provides a method of mass connecting a plurality of integrated circuit packs to a circuit panel having a plurality of upstanding pins rigidly mounted therein. The steps comprising the method include: aligning the microcircuit packs in a row with the leads thereof extending upwardly; placing the carrier strip having a plurality of ductile electrical connectors mounted thereon over said leads so that the leads extend through the electrical connectors; bending the leads over the electrical connectors, whereby the integrated circuit packs are also carried by the carrier strip; positioning the carrier strip over the upstanding pins on the circuit panel such that the respective pins also extend through the electrical connector; and mass crimping the ductile electrical connectors to form a mechanical and electrical connection between the respective upstanding pins and the leads of the integrated circuit packs.

These and other objects of the invention may be more readily appreciated by reference to the following description taken in conjunction with the following figures and appended claims:

FIGS. 2 and 3 illustrate the first step in the method of the invention;

FIGS. 4, 5 and 6 illustrate the second step in the method of the invention;

FIGS. 9 and 10 illustrate the fourth step in the invention;

FIGS. 11 and 12 illustrate a suitable crimping tool for mass crimping the ductile electrical connectors;

FIGS. 13, 14 and 15 illustrate the fifth step in the method of the invention.

Figure 1:
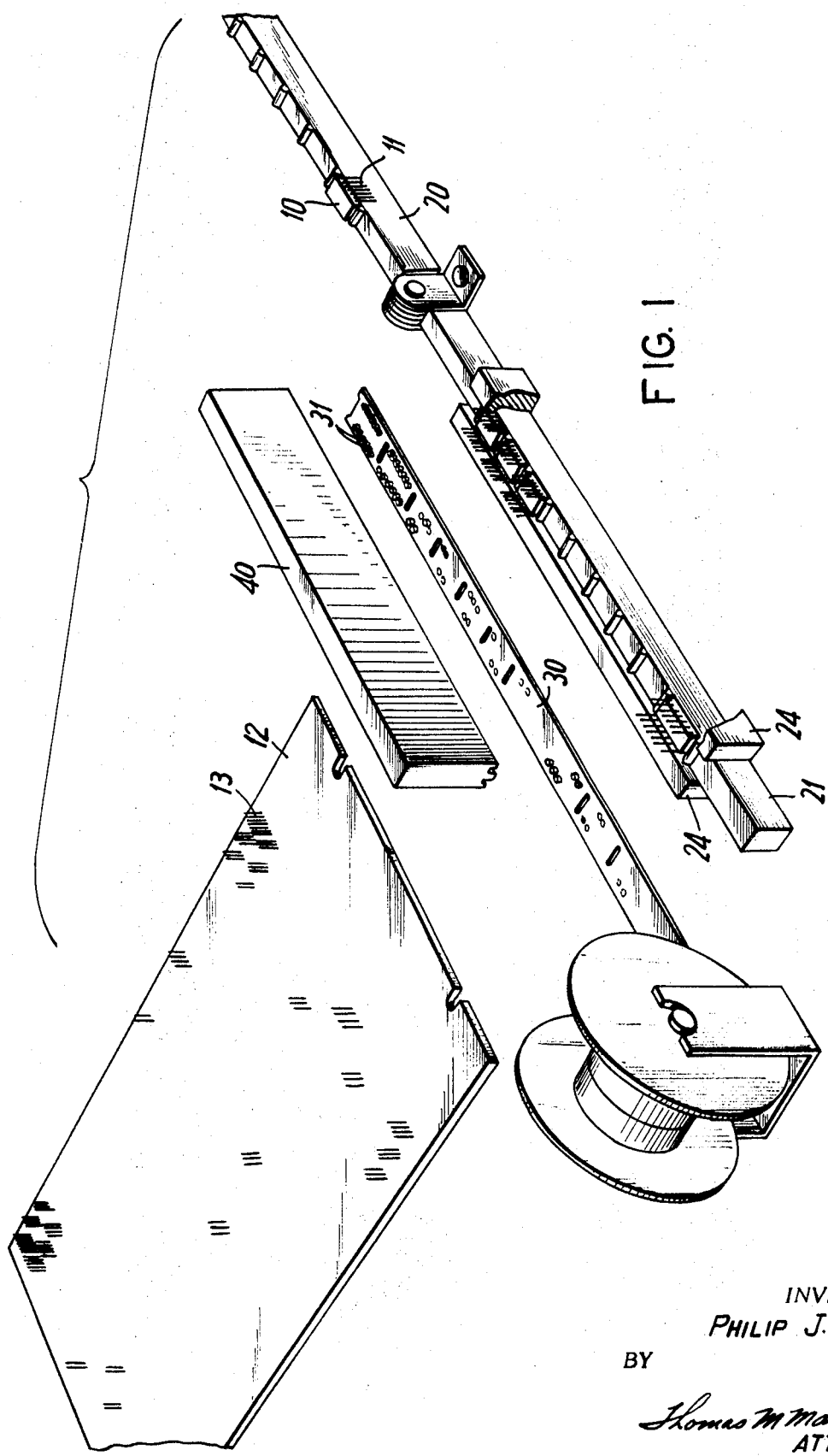
FIG. 1 is an exploded perspective view of the apparatus used in practising the method of the invention.

Turning to FIG. 1, the method of the present invention is intended to achieve the mechanical and electrical connection of a plurality of integrated circuit packs 10 having two rows of leads 11 to a printed circuit panel 12 including upstanding pins 13 disposed therethrough. The alignment and location of upstanding pins 13 is in accordance with the specific alignment and location of the leads 11 whereby the resulting assembly produces rows of integrated circuit packs mounted on the panel 12.

The first step in the method of the invention is to align the integrated circuit packs in a row with the leads 11 extending upwardly. As illustrated in FIGS. 2 and 3, one form of apparatus for achieving this step is an assembly consisting of two bars 20, 21 pivoted on a common pivot pin 22, with both bars including spacers 23 for spacing the integrated circuit packs 10. Initially the integrated circuit packs are placed, leads down, on the bar 20, after which bar 21 is pivoted to the dotted line position illustrated in FIG. 2 to abut against the back sides of the integrated circuit packs. Both bars are then simultaneously rotated 180° about pin 22, after which bar 20 is again rotated 180° back to its original position whereby the first step in the method is achieved. This is illustrated in solid lines in FIG. 3. Also, FIG. 3 illustrates the particular geometry of the leads 11 of each integrated circuit pack, each lead including a reduced width portion 11' adjacent its free end.

As clearly shown in FIG. 1, disposed on each side of the bar 21 are fixed bars or mandrels 24 which extend up to the transition point in the width of each lead 11 at which the reduced width portion 11' begins. The lateral spacing between the mandrels 24 closely approximates the lateral thickness of the bars 20, 21 such that, as the bars are rotated between the mandrels, the leads 11 are effectively combed and straightened in preparation for subsequent steps in the method of the invention.

The next step in the method is to extend each lead 11 through a suitable ductile electrical connector mounted on a carrier strip. As illustrated in FIGS. 1 and 4, one form of apparatus for achieving this step is a strip of plastic 30 having a plurality of cylindrical electrical connectors 31 suitably mounted thereon and therethrough, whereby the leads 11 of the integrated circuit packs may extend through the connectors 31. Each connector is made of an electrically conductive material having sufficient ductility in order to be crimpable to form a mechanical and electrical connection between an upstanding pin and a lead 11 extending from an integrated circuit pack. Preferably, the connectors are made of a powdered metal and may be of a type disclosed in U.S. Pat. No. 3,345,452. In such case, each connector may be readily shattered by merely the application of a tensile force, whereby an integrated circuit pack may be selectively removed from the panel without causing damage to the upstanding pins.

Figure 5:
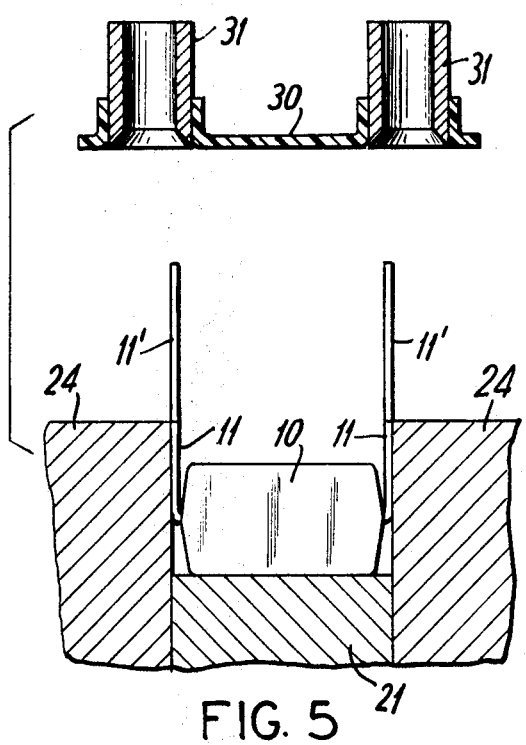

The spacing and alignment of the connectors 31 are coordinated with the spacing and alignment of the leads of the integrated circuit packs, as positioned on the bar 21. In order to mount the electrical connectors 31 on the plastic strip 30, holes of a diameter less than the diameter of the connectors 31 may be punched in the strip 30 at the required locations, after which the electrical connectors may be forced through the plastic sheet to cause stretching of the plastic, as shown in FIG. 5. When properly aligned, the plastic sheet is slipped over the reduced width portions 11' of the leads 11 (so that each of the latter extends through an electrical connector 31) and rests on the mandrels 24. Additionally, as shown in FIG. 10, the diameter of each electrical connector 31 is suitably dimensioned with respect to the width of the root portion of lead 11 such that the electrical connector readily passes over the reduced width portion 11' and rests on the stepped portion of the lead.

In order to attach the integrated circuit packs to the carrier strip, the next step in the method is to bend the reduced width portions 11' of the leads 11 around the connectors 31. Any suitable bending device, such as a die for simultaneously bending a plurality of leads, may be employed.

Figure 6:
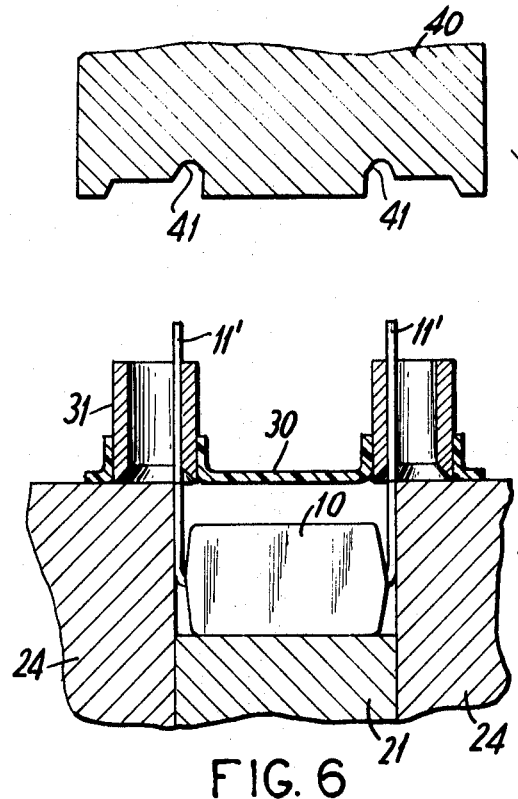
Figure 7:
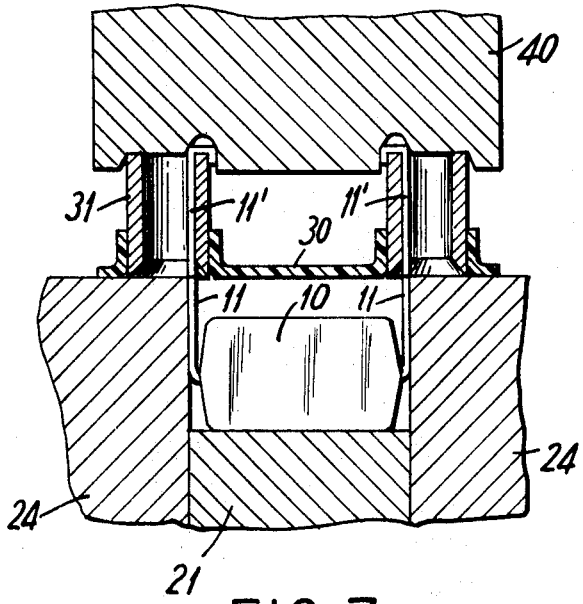
FIGS. 7 and 8 illustrate the third step in the method of the invention.
Figure 8:
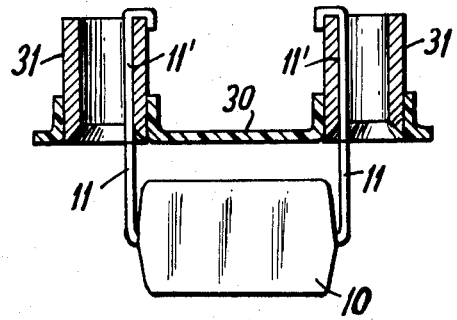

As illustrated in FIGS. 6 and 7, an elongated die 40 includes two suitably configured grooved structures 41, 41 for simultaneously bending the leads on each side of the row of integrated circuit packs. The resulting assembly is illustrated in FIG. 8 wherein it is readily seen that the carrier strip 30 supports both the electrical connectors 31 and the integrated circuit packs 10.

Turning to FIG. 9, the next step in the subject method comprises positioning the carrier strip 30 (including the plurality of integrated circuit packs carried thereby) over the upstanding pins 13 on the circuit panel 12 such that the respective pins also extend through the electrical connectors 31.

In order to complete the method of connecting the integrated crcuit packs to the panel, use is made of a conventional power operated crimping device 50 (FIGS. 11 and 12) including pointed crimping heads 51 and 52 that are relatively wide in order to simultaneously crimp a plurality of electrical connectors. As shown in FIG. 13 crimping head 52 is slightly longer than crimping head 51 for alignment and positioning purposes, and rests on the printed circuit board 12, while crimping head 51 is positioned intermediate the leads 11. The crimping heads include bulbed portions 51', 52' which are oppositely disposed whereby the crimping force is localized immediately on the opposite sides of the electrical connectors. The resulting assembly of integrated circuit packs to the printed circuit board is illustrated in FIGS. 14 and 15. When powdered metal electrical connectors are employed, the crimped connectors will produce a gas type joint due to the "no spring-back" condition of the material used. Along the same lines, in order to remove an integrated circuit pack, it is only necessary to squeeze each associated electrical connector 90° from the crimping direction (i.e. exert a tensile force on the electrical connector) thereby either shattering or loosening the electrical connector in order to enable sliding of the electrical connector from the upstanding post.

Figure 16:
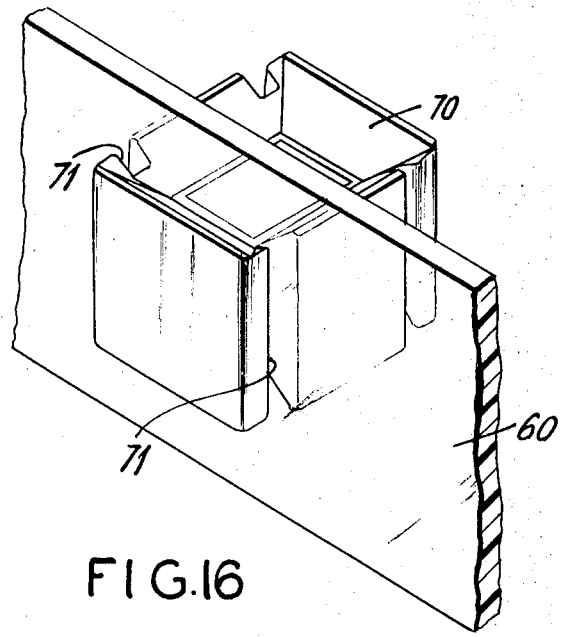
FIGS. 16, 17 and 18 illustrate an alternative form of carrier strip.
Figure 17:
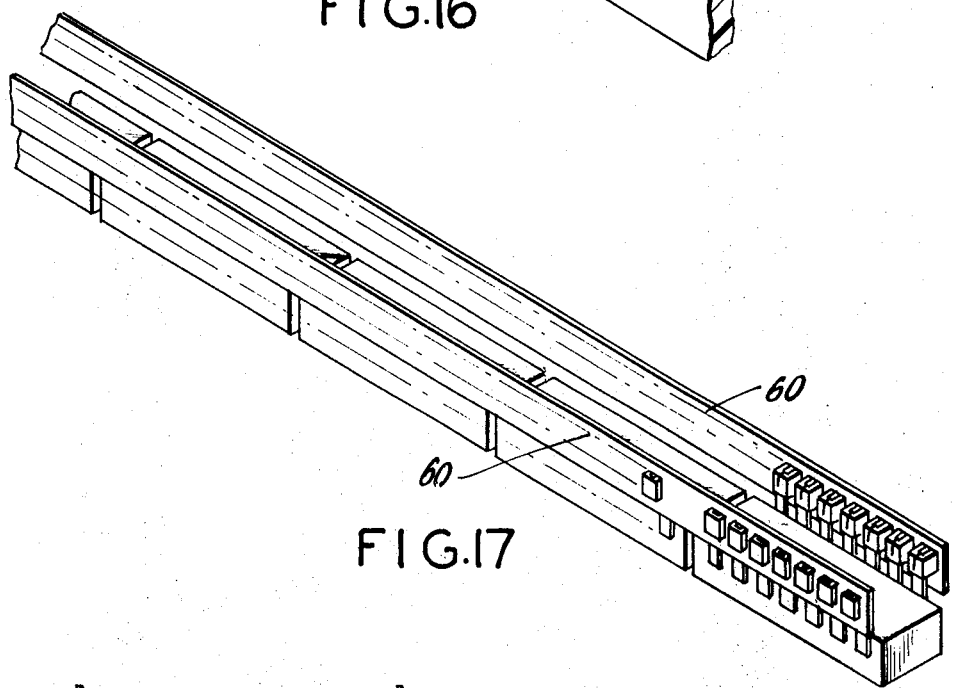
Figure 18:
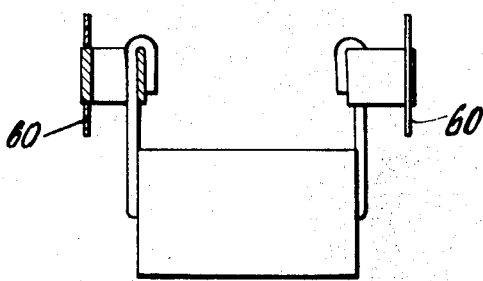

FIGS. 16, 17 and 18 illustrate a modified form of the carrier strip for carrying the ductile electrical connectors. As shown in FIG. 16 each carrier strip 16 only carries one row of ductile electrical connectors. Each connector 70 is illustrated as being generally rectangular in cross-section, and includes vertical slits 71 which, after the side of the electrical connector is inserted through a slit in the plastic strip 60, act as a locking means for maintaining the connector 70 on a strip 60.

As shown in FIGS. 17 and 18, in order to connect a plurality of integrated circuit packs to a panel in one simultaneous operation, it is necessary to employ two of the carrier strips 60, one for each side of the integrated circuit packs. The remaining steps in the process are substantially the same. One advantage of using two strips instead of the one strip system illustrated in FIGS. 1–15, is that the use of two strips enables greater air circulation around the I.C. packs which, in certain applications, is desirable for maintaining the temperature of the electrical system below a critical level.

If desired, after installation of the integrated circuit packs to the panel board, the plastic carrier strip may be removed by merely tearing the strip from the assembly.

In summary there has been disclosed a method of connecting a plurality of integrated circuit packs to a printed circuit board in a simultaneous operation which results in a highly reliable assembly, capable of being performed at low cost with unskilled personnel.

Having thus described the invention, it is not intended that it be so limited as changes may be readily made therein without departing from the scope of the invention. Accordingly, it is intended that the abstract of the disclosure and the subject matter described above and shown in the drawings be interpreted as illustrative only, and not in a limiting sense.

What is claimed is:

1. A method of connecting a plurality of microcircuit packs, each having a plurality of leads, to the upstanding pins on a circuit panel comprising the steps of:
   aligning the microcircuit packs in a row with the leads thereof extending upwardly;
   placing a carrier strip having a plurality of ductile electrical connectors mounted thereon over said leads so that the leads extend through the electrical connectors;
   bending the leads of the microcircuit packs over the electrical connectors so that the microcircuit packs are also carried by the carrier strip;
   positioning the carrier strip over the upstanding pins on the circuit panel such that the respective pins also extend through the electrical connector; and
   crimping the electrical connectors to form a mechanical and electrical connection between respective upstanding pins and the leads of the microcircuit packs.

2. A method of connecting a plurality of micro-circuit packs to a circuit panel as in claim 1 with the additional step of stripping the carrier strip from the panel assembly.

3. A method of connecting a plurality of microcircuit packs to a circuit panel as in claim 1 wherein a plurality of electrical connectors are crimped simultaneously.

4. A method of connecting a plurality of microcircuit packs, each having two rows of a plurality of leads, to the upstanding pins on a circuit panel comprising the steps of:
aligning the microcircuit packs in a row with the leads thereof extending upwardly;
placing a first carrier strip having a plurality of ductile electrical connectors mounted thereon over one row of the microcircuit pack leads so that the latter extend through said connectors;
placing a second carrier strip having a plurality of ductile electrical connectors mounted thereon over the other row of the microcircuit pack leads so that the latter extend through said connectors;
bending the leads of the microcircuit packs over the electrical connectors carried by said first and second carrier strips so that the microcircuit packs are also carried by said carrier strips;
positioning said carrier strips over the upstanding pins on the circuit panel such that the respective pins also extend through said electrical connectors; and
crimping the electrical connectors to form a mechanical and electrical connection between the respective upstanding pins and the leads of the microcircuit packs.

5. A method of connecting a plurality of microcircuit packs as in claim 4 with the additional step of stripping the first and second carrier strips from the panel assembly.

6. A method of connecting a plurality of microcircuit packs as in claim 4 wherein a plurality of electrical connectors are crimped simultaneously.

References Cited

UNITED STATES PATENTS 2,778,977  1/1957  Lubkin _____ 29—604
3,083,261  3/1963  Francis et al. _____ 317—101 D JOHN F. CAMPBELL, Primary Examiner R. W. CHURCH, Assistant Examiner U.S. Cl. X.R.

29—629 R, 628 R, 423 R, 203 R, 429; 317—101 C, 101 D, 101 CC, 101 CM; 339—17 C, 17 M, 276 R